United States Patent [19]

Watanabe et al.

[11] Patent Number: 5,068,804
[45] Date of Patent: Nov. 26, 1991

[54] DOCUMENT INPUT METHOD AND APPARATUS

[75] Inventors: Tan Watanabe, Yokohama; Hideki Nishino, Tsukui; Hidefumi Iwami, Yokohama; Kuniaki Tabata, Nishitama, all of Japan

[73] Assignee: Hitachi, Ltd., Tokyo, Japan

[21] Appl. No.: 520,133

[22] Filed: May 7, 1990

Related U.S. Application Data

[63] Continuation of Ser. No. 212,433, Jun. 28, 1988, abandoned.

[30] Foreign Application Priority Data

Jul. 3, 1987 [JP] Japan .................................. 62-165319

[51] Int. Cl.$^5$ .............................................. G06F 15/62
[52] U.S. Cl. ....................................... 395/147; 382/16; 382/25; 364/474.24
[58] Field of Search ....................... 364/474.24, 474.25, 364/518, 521; 382/10, 14, 15, 16, 23, 25, 30, 48, 57, 38, 33, 34, 36, 54

[56] References Cited

U.S. PATENT DOCUMENTS

| | | | |
|---|---|---|---|
| 3,930,237 | 12/1975 | Villers | 364/518 X |
| 3,967,241 | 6/1976 | Kawa | 382/38 |
| 4,047,154 | 9/1977 | Vitols et al. | 382/38 X |
| 4,451,929 | 5/1984 | Yoshida | 382/15 |
| 4,491,965 | 1/1985 | Yoshimura | 382/57 |
| 4,665,555 | 5/1987 | Alker et al. | 382/57 X |
| 4,736,159 | 4/1988 | Shiragasawa | 382/8 X |
| 4,747,148 | 5/1988 | Watanabe et al. | 382/10 |
| 4,748,675 | 5/1988 | Suzuki et al. | 382/14 X |
| 4,776,020 | 10/1988 | Kosaka et al. | 382/10 X |
| 4,783,829 | 11/1988 | Miyakawa et al. | 382/25 X |
| 4,827,330 | 5/1989 | Walsh et al. | 382/57 X |
| 4,933,865 | 6/1990 | Yamamoto et al. | 364/518 |

OTHER PUBLICATIONS

Bove, T. et al., The Art of Desktop Publishing Using Personal Computers to Publish it Yourself, Chapt. 4, Bantam Computer Books, 1987, pp. 113-128.

Primary Examiner—Gary V. Harkcom
Assistant Examiner—Michael A. Jaffe
Attorney, Agent, or Firm—Fay, Sharpe, Beall, Fagan, Minnich & McKee

[57] ABSTRACT

An input method and an input apparatus wherein a sketch read by an image scanner is displayed on the display, the class of component figure is designated thereon, characteristic values are input, and positions of characteristic points are designated such that a figure of fair copy is automatically prepared. Further, the sketch and the figure of fair copy are displayed being superposed upon each other while modifying the brightness or color so that the results of input can be easily recognized, making it possible to reduce the work for inputting the figure and to easily determine the size and position of the figure on the document which is a constituent component. In preparing the figure of fair copy by recognizing through a pattern recognition device the sketch that is input by the image scanner, furthermore, those portions that were not properly recognized are input again by the above method and apparatus.

7 Claims, 13 Drawing Sheets

W1: SKETCH WINDOW
W2: FAIR COPY WINDOW
131: SKETCH DISPLAY AREA
132: FAIR COPY DISPLAY AREA
1301: SKETCH VIRTUAL DISPLAY
1302: FAIR COPY VIRTUAL DISPLAY

DOCUMENT INPUT METHOD AND APPARATUS

This is a continuation of copending application Ser. No. 07/212,433 filed on Jun. 28, 1988, now abandoned.

BACKGROUND OF THE INVENTION

The present invention relates to a system for inputting documents inclusive of graphs to a computer. More specifically, the invention relates to a document input method and apparatus, adapted to draw fair copies of graphs and sketches such as drawings and schematic diagrams.

According to a conventional apparatus as disclosed in, for example, Tony Bove et al., The Art of Desktop Publishing Using Personal Computers To Publish It Yourself, Chapter 4, pp. 113-128, Bantam Computer books, 1986, the figure that is input through an image scanner simply occupies a corner of the document independently of a figure that is manually input. Therefore, the figures are input through trial and components that constitute the figure, thus requiring long work to complete the input operation. Even when a figure is input through the image scanner, it is necessary to again make a fair copy of all constituent elements of the figure so that each element can be processed independently. Namely, attention has not been given with regard to the efficiency of the input operation.

In a document processor used for preparing a document displaying the results of key operations, the operations are in many cases carried out while looking at the sketch and comparing it with the displayed results.

In such a case, in general, a user determines the layout of document while making reference to the sketch that is placed near the document processor, and produces a similar layout on the display.

In order to adjust the layout of the displayed document to be the same as that of the sketch according to the above prior art, however, a lot of trial and error is required for the compilation operation that is carried out to obtain a desired layout, causing the input efficiency to be very low.

SUMMARY OF THE INVENTION

It is a first object of the present invention to make it easy to input figures of fair copy by profiling a sketch that is input by the image scanner, to clearly distinguish the figure of fair copy from the sketch to eliminate confusion. This obviates the need or redrawing a fair copy of the whole sketch, and decrease the amount of work even for the figure of fair copy that is manually input.

A second object of the present invention is to facilitate the operation for compiling the layout of the document on the display.

As for the first object, the figure of fair copy can be distinguished from the sketch by setting either of the brightness or the color between the two to be different, and by erasing or reproducing the sketch.

The work of inputting the figure of fair copy can be reduced by having the sketch recognized by a pattern recognition mechanism and by making a fair copy of only those portions that are not recognized, and by inputting such portions. Even for the portions that were not properly recognized by the pattern recognition mechanism, the work of inputting the fair copy can be reduced by again executing the recognition processing through manually instructing the class of figure to enhance the recognition factor. Another method of reducing the work for inputting the figure of fair copy consists of designating the kind of component figure by an input, and making a fair copy of the component figure by designating the characteristic points only.

The above-mentioned second object is achieved by executing a first step for displaying the sketch that is input through the image scanner and executing a second step of inputting and displaying the data for the figure of fair copy that is displayed being superposed on the sketch permitting the sketch to be seen through.

In the second step, either a minor third step for erasing unnecessary portions of the sketch or a minor fourth step for moving the displayed sketch corresponding to the figure of fair copy is provided.

Through the first and second steps, the content can be easily transferred onto the figure of fair copy while seeing it through the sketch on the display.

Through the third step, furthermore, the figure of fair copy can be seen more clearly since unnecessary portions of the sketch are erased that would have been seen superposed on the display portion of input data in the figure of fair copy. Moreover, the fourth step makes it possible to move the position of the sketch to a given position in the figure of fair copy, increasing the document compilation operability.

DETAILED DESCRIPTION OF THE PREFERRED EMBODIMENT

Described below is a fundamental idea of the present invention.

When a document is to be input using the document processor of the present invention, a figure in the document is first input by an image scanner and is displayed on the screen. Then, the whole figure is moved, and is expanded or contracted such that the frame of the displayed sketch will have a proper arrangement and size on the document. Then, the position and size of the figure is designated for the individual constituent components for the display on which the sketch is displayed.

For instance, when the component figure is of a rectangular shape, the user designates that it is of a rectangular shape, and then two vertexes on diagonal lines of the rectangular figure are designated on the sketch by a pointing device such as a mouse. The vertexes and the length of sides can also be designated through the keyboard in terms of numerical figures. What should be input is displayed on a sample figure in a step where the class of the figure is designated. The component figure as a result of input is automatically and readily displayed in the form superposed on the sketch. When the component figure is a circle, three points on the displayed sketch are designated by the pointing device as points on the circumference, or are input in a way to designate the center and the radius, or to designate two points on the circumference and the radius. When the component figure is a straight line, the two end points on the sketch are designated by the pointing device, or are input in a way to designate the end points and the length.

When a pattern recognition mechanism is to be utilized, the recognition processing of constituent elements is effected for the sketch that is input by the image scanner, and the recognized component figure is displayed while changing the color or brightness. The user designates the class and name of the component figure for the portions that are not recognized or for the portions that are erroneously recognized while looking at the recognized figure, and designates characteristic points of a portion thereof using the pointing device. In response to, the designation, the pattern recognition mechanism again executes the recognition processing for the non-recognized portions and for the erroneously recognized portions that are designated.

As for the portions that are not well recognized by the pattern recognition mechanism a proper figure is input by the method the same as that for inputting the component figure.

As for the sketch and the figure of fair copy, different colors and brightnesses are specified on the display so that they will not appear in a confusing manner. The sketch is gradually darkened, erased, or brightened again to observe the degree to which the whole figure is finished, and to easily detect missing portions or nonconformaties. The printing output may be either the document of fair copy without the sketch or the document of fair copy on which the sketch is superposed.

According to this system, the figure of fair copy that is seen through and the sketch that is input using the image scanner are displayed by using different brightness and/or color. Therefore, they do not appear in a confusing manner, and the nonconformity or the leakage of input is prevented from taking place. Furthermore, what is input in fair copy is limited to those that were not properly recognized by the pattern recognition mechanism, contributing to reducing the amount of work for input. Even for those portions that were not properly recognized, the recognition is executed again by making reference to the attributes of the class of component figure, to enhance the recognition factor.

A first embodiment of the present invention will now be described in conjunction with FIGS. 1 to 9. The document processing apparatus shown in FIG. 1 comprises a document processor 1, a pattern recognition mechanism 2 contained therein, a display 3, a keyboard 4, a mouse 5 that serves as a display designation device, an image scanner 6, a printer 7, and an auxiliary storage 8. The auxiliary storage 8 is used for preserving the document that is input, and for registering the data of shapes of the existing component figure and a component figure which the user has prepared by himself.

Figure 1:
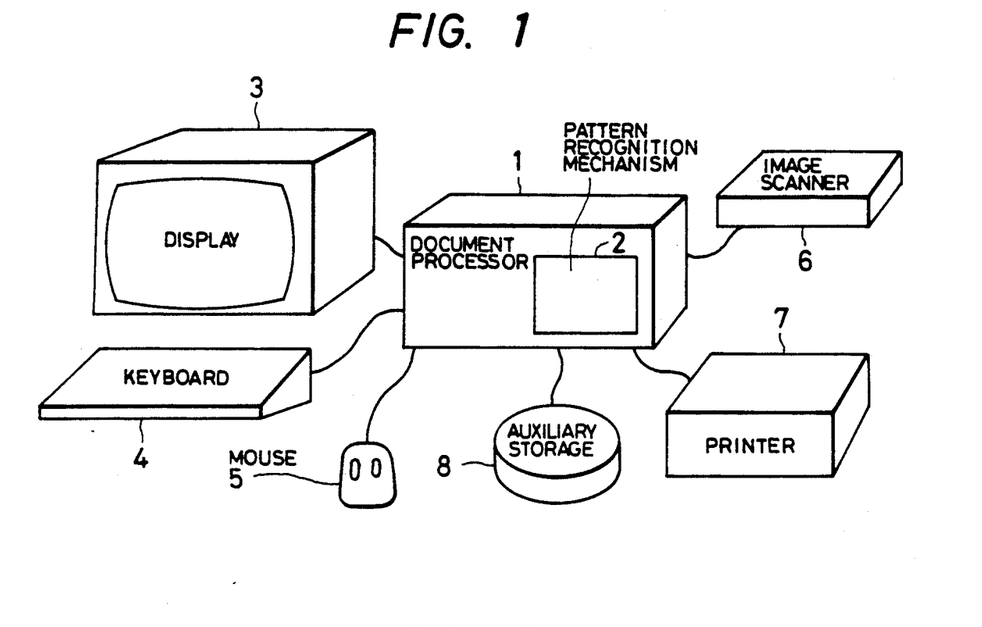
FIG. 1 is a diagram illustrating the constitution of an embodiment of the present invention.

To input the document which includes the figure, the paper describing the sketch of the figure is read by the image scanner 6, and the data of the shape is sent to the processor 1 and is displayed on the display 3. In response to the instruction input through the keyboard 4 or the mouse 5 by the user, the processor adjusts the position on the document of the figure input through the image scanner and expands or contracts the size of the figure while looking at the display 3.

Figure 2:
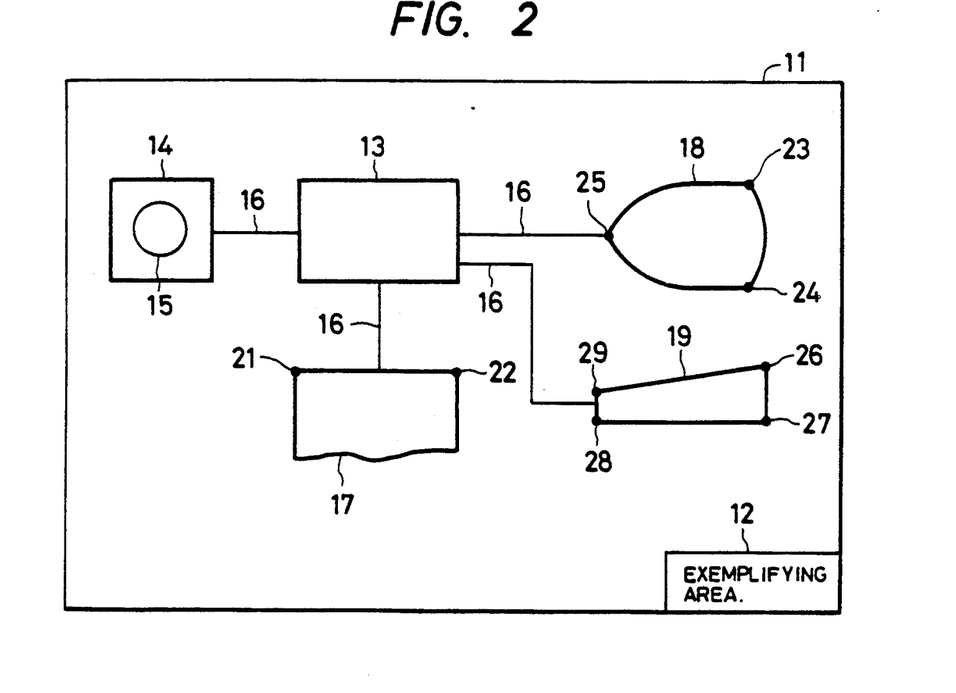
FIG. 2 illustrates an example of when the sketch and the figure of fair copy are displayed in a superposed manner by a document processor.

Next, the pattern of the sketch is recognized by the pattern recognition mechanism 2. Described below is the case where a figure shown in FIG. 2 is to be input. The whole figure is displayed on the display 3 at a low brightness immediately after the sketch is read by the image scanner 6. When the pattern recognition mechanism 2 is actuated, however, the recognized portions appear maintaining a high brightness. FIG. 2 illustrates a display at that time. A rectangle 13, a square 14 and four connection lines 16 are recognized and appear in high brightness. The component FIGS. 15, 17, 18 and 19, however, are not recognized and are displayed in low brightness (in FIG. 2, the portions of high brightness are indicated by thick lines and the portions of low brightness are indicated by fine lines).

Figure 3:
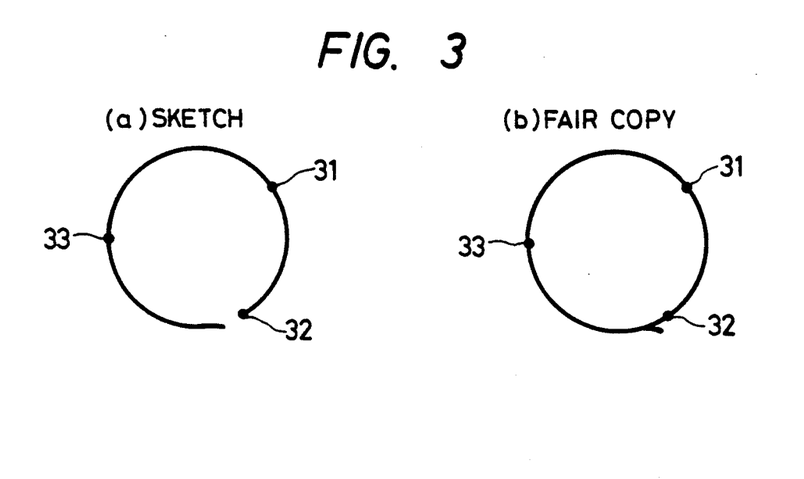
FIG. 3 illustrates an example of recognizing a circle which is based upon an incomplete sketch.

It is now presumed that the component FIG. 15 that is input through the image scanner 6 is partly deflected in the contour and is cut away as shown in FIG. 3(a) and is identified to be equal to none of the component figures that have been registered or catalogued. The user notices that the component FIG. 15 remains displayed in low brightness, and therefor designates a point 31 on the line using a mouse 5, and designates through the keyboard 4 that this is a component figure which is a circle. Then, a circle recognition part of the pattern recognition mechanism is started, whereby a circle re-recognition method is carried out by selecting other two points 32 and 33 that are separated away from each other as far as possible on a curve connected to the point 31, to make a fair copy of a circle that passes through three points 31, 32 and 33 as shown in FIG. 3(b) Even for component figures that were not originally properly recognized, the user can designate the class of figure and thereby a mechanism for recognizing that class of figures is actuated to again effect the trial and complete the recognition.

Figure 4:
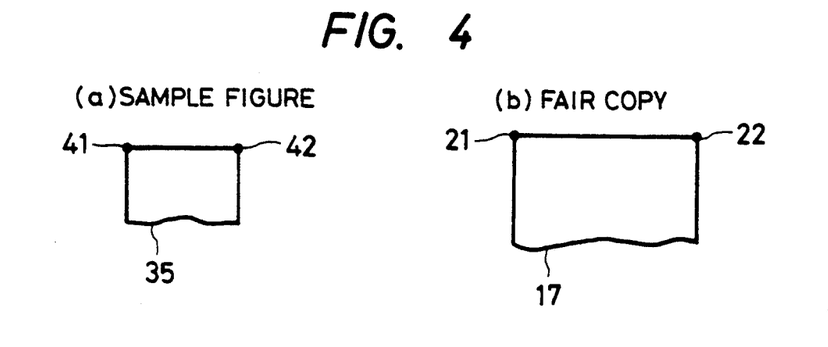
FIG. 4 illustrates an example of recognizing printer figures based upon sample figures.

When the component FIGS. 17, 18 and 19 are still not recognized even after the above-mentioned step, data is then input as described below. Here, the component FIG. 17 is the catalogued as "printer". When the user designates the "printer" in the form of a character string through the keyboard 4 or in the form of a select designation through the mouse 5 to specify the class of component figure, the processor 1 examines the catalogued data of component figures, and displays a sample FIG. 35 of printer in the exemplifying area 12 (FIG. 1) as shown in FIG. 4(a). Then, in order to promote the input of data that represents the position and size of the printer, two vertexes 41 and 42 of the sample figure of the printer are blinked as characteristic input points. As the user designates the points 21 and 22 on the sketch by the mouse 5 as actual points that correspond thereto, the component FIG. 17 is recognized as a printer with the points 21 and 22 as vertexes, and the contour line of the FIG. 17 is displayed maintaining a high brightness being superposed on the sketch (FIG. 4(b)).

Figure 5:
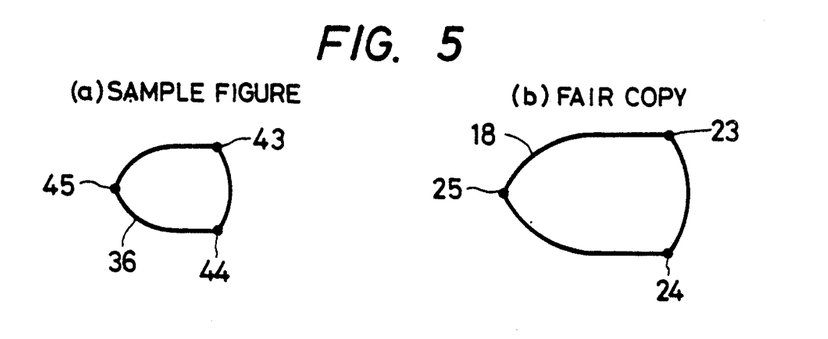
FIG. 5 illustrates an example of recognizing displayed figures.

Similarly, as the user designates the "display" as a character string from the keyboard 4 or as a select designation by a mouse 5 to specify the class of the component figure, with the constituent component 18 serving as a figure that has been catalogued as "display", the processor displays a sample FIG. 36 in the exemplifying area 12 as shown in FIG. 5(a). In order to promote the input of data that indicates the position and size thereof, three vertexes 43, 44 and 45 of the sample figure are blinked. As the user designates the points 23, 24 and 25 on the sketch by the mouse 5 as actual points that correspond thereto, the component FIG. 18 is recognized as a display with the points 23, 24 and 25 as vertexes, and the contour lines are displayed maintaining high brightness being superposed on the sketch (FIG. 5(b)).

When it is designated that the class of the component FIG. 19 is a polygon, a sample figure of polygon is displayed in the exemplifying area and the vertexes thereof undergo blinking. In response to, four vertexes 26, 27, 28 and 29 on the sketch are designated by the mouse 5 and thereby the figure is recognized as a polygon and the contour lines are displayed maintaining high brightness.

Figure 6:
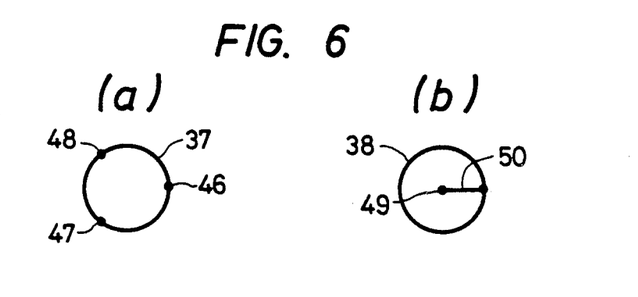
FIG. 6 illustrates sample figures of a circle.

When the pattern recognition mechanism 2 is not used, class is designated even for the component FIGS. 13, 14, 15 and 16 in the same manner as described above, and the vertexes and the end points are designated using the mouse to promote the input in the sample figure, and the figure is input by inputting numerical figures of sizes and positions using the keyboard. As for the component FIG. 13, a rectangle is designated to designate three vertexes in accordance with the sample figure and as for the component FIG. 14, a square is designated to designate three vertexes in accordance with the sample figure. As for the component FIG. 15, when a circle is designated, there is displayed in the exemplifying area 12 a circle 37 (FIG. 6(a) in which three points 46, 47 and 48 blink on the circumference and a circle (FIG. 6(b) in which a center 49 and a line 50 representing the radius blink. Therefore, either one of the methods is selected to make a fair copy of a circle. When the former method is selected, the operation is carried out in the same manner as the aforementioned method of recognizing circles. When the latter method is selected, the center is designated by the mouse 5 and the length of radius is input as a numerical value from the keyboard 4 to make a fair copy of the circle.

Figure 7:
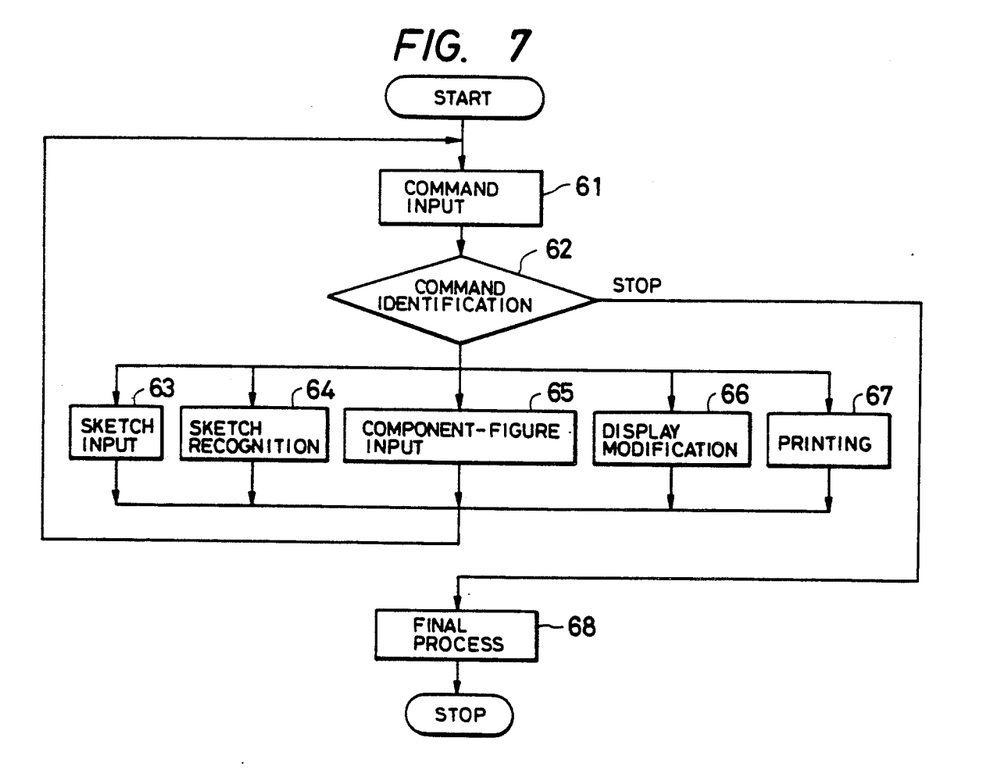
FIG. 7 is a flow chart of document processing.

FIG. 7 is a flow chart illustrating the processing procedure in the document processing apparatus of the present invention. The user inputs a command (step 61) using the keyboard or the mouse. The class of the command is identified (step 62), and processing is carried out corresponding to the class. That is, any one of sketch input (step 63), sketch recognition (step 64), component figure input (step 65), display modification (step 66) or printing (step 67) is executed. When the end command is received, the final process (step 68) is executed. In the display modification process (step 66), the brightness and color of the sketch are modified, the sketch is partly erased, or the brightness and color are modified in the figure of fair copy. It is also allowable to again display the sketch that is erased.

Figure 8:
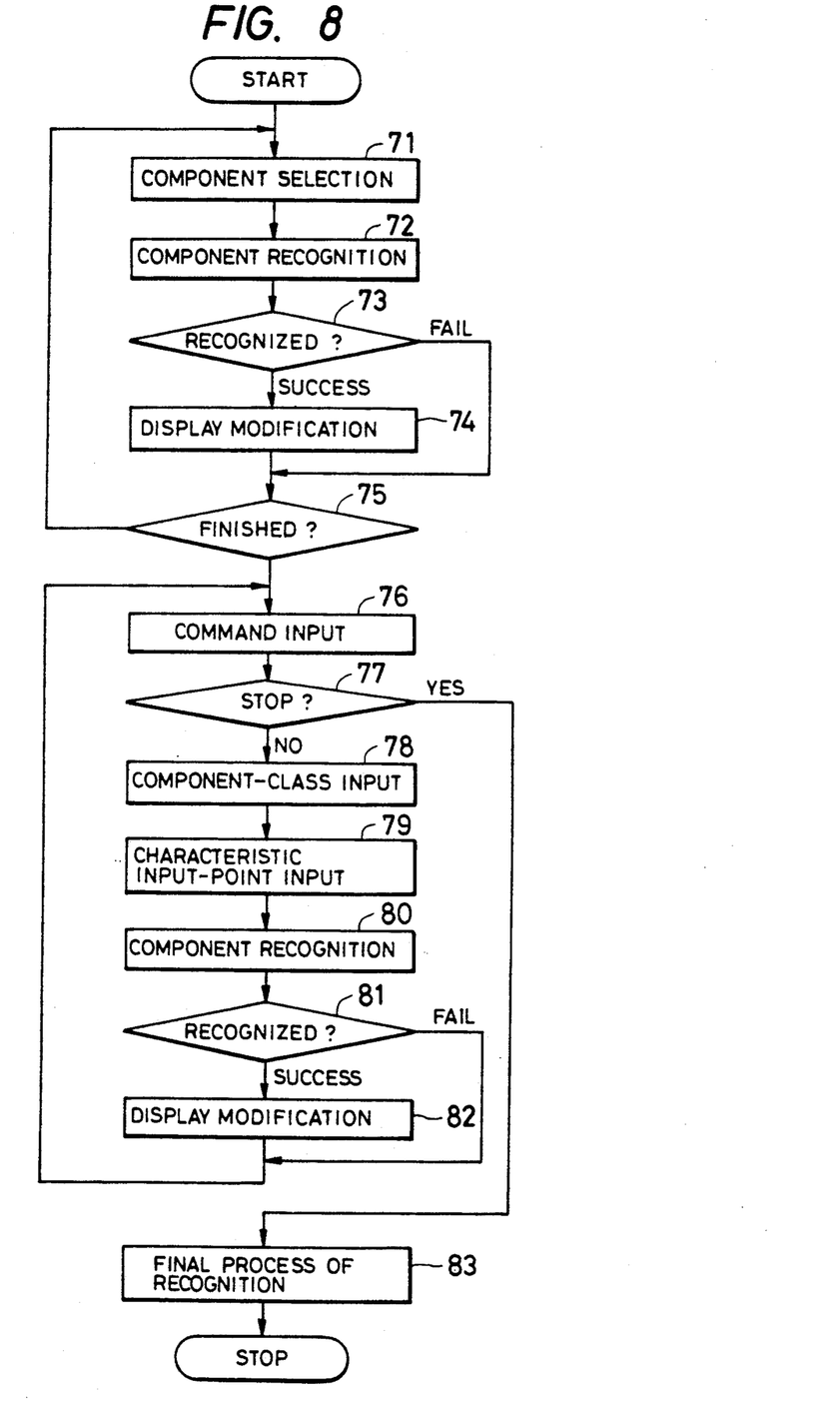
FIG. 8 is a flow chart of sketch recognition processing.

FIG. 8 is a flow chart illustrating the procedure for processing the sketch recognition (step 64). First, any one of the component figures constituting the sketch is selected (step 71) to recognize to which catalogued component figure it corresponds (step 72). When it is determined that the recognition is successful (step 73), the brightness or color of the recognized portion is modified (step 74). When the recognition is not successful, the procedure remains unchanged. The above-mentioned processing is repeated until there is no non-selected portion (step Thereafter, a command from the user is received (step 76). When it is not the end command (step 77), the class of component figure is input (step 78) to promote the input of characteristic points therefor and to input the positions and the lengths (step 79). In response thereto, component figure recognition processing is carried out (step 80). When the recognition is successful (step 81), display of the recognized portion is modified (step 82). The procedure remains unchanged when the recognition is not successful. The procedure is repeated again starting from the command input processing (step 76). When the recognition end command is received, the final process of recognition is effected (step 83) to end the program.

Figure 9:
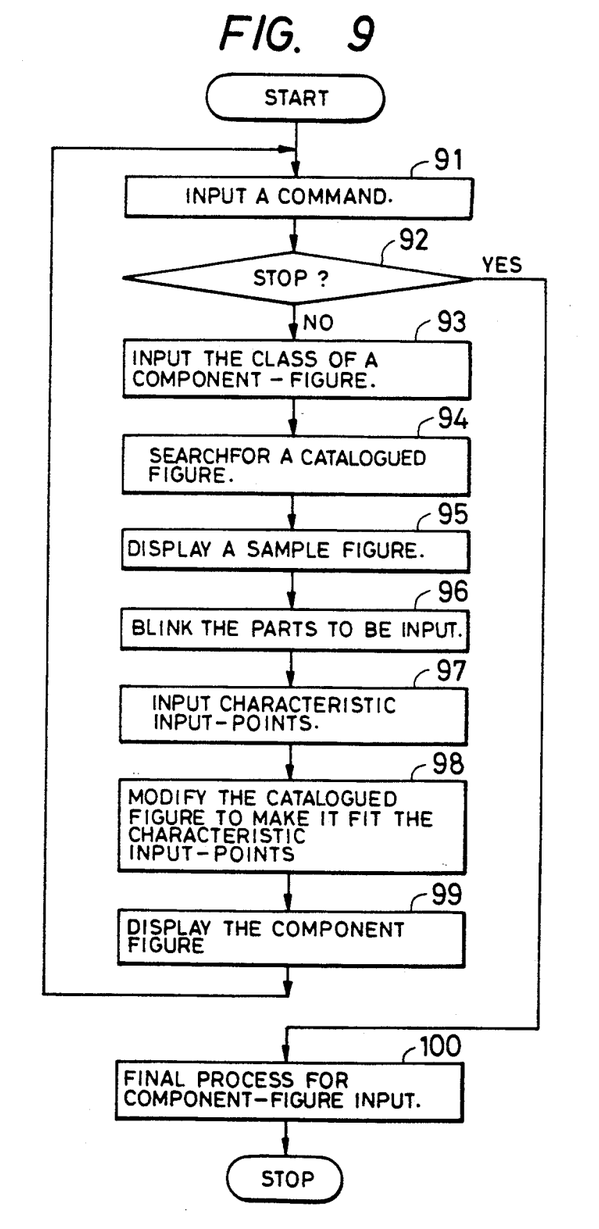
FIG. 9 is a flow chart of component figure processing.

FIG. 9 is a flow chart illustrating the procedure for processing the component figure input (step 65). A command from the user is input (step 91). When it is not an end command (step 92), the class of component figure is input (step 93). The data of the designated component figure is searched from the component figures stored in the auxiliary storage 8 or from the library in which are catalogued component figures prepared by the user (step 94), and a sample figure is displayed on the exemplifying area (step 95). When, the corresponding parts are blinked (step 96) on the sample figure to promote the input of the position and size of the designated component figure as well as points, lines and numerical figures that serve as characteristic points to indicate the shape. When the user designates characteristic points in response thereto, the characteristic points are input (step 97), the catalogued figure is modified accordingly (step 98), and then the component figure is displayed with its brightness or color being modified (step 99). The procedure is repeated again starting from the command input (step 91). When the end command is input, the final process (step 100) is effected for the component figure to terminate the procedure.

Next, a second embodiment of the present invention will be described in conjunction with FIGS. 10 to 19.

Figure 10:
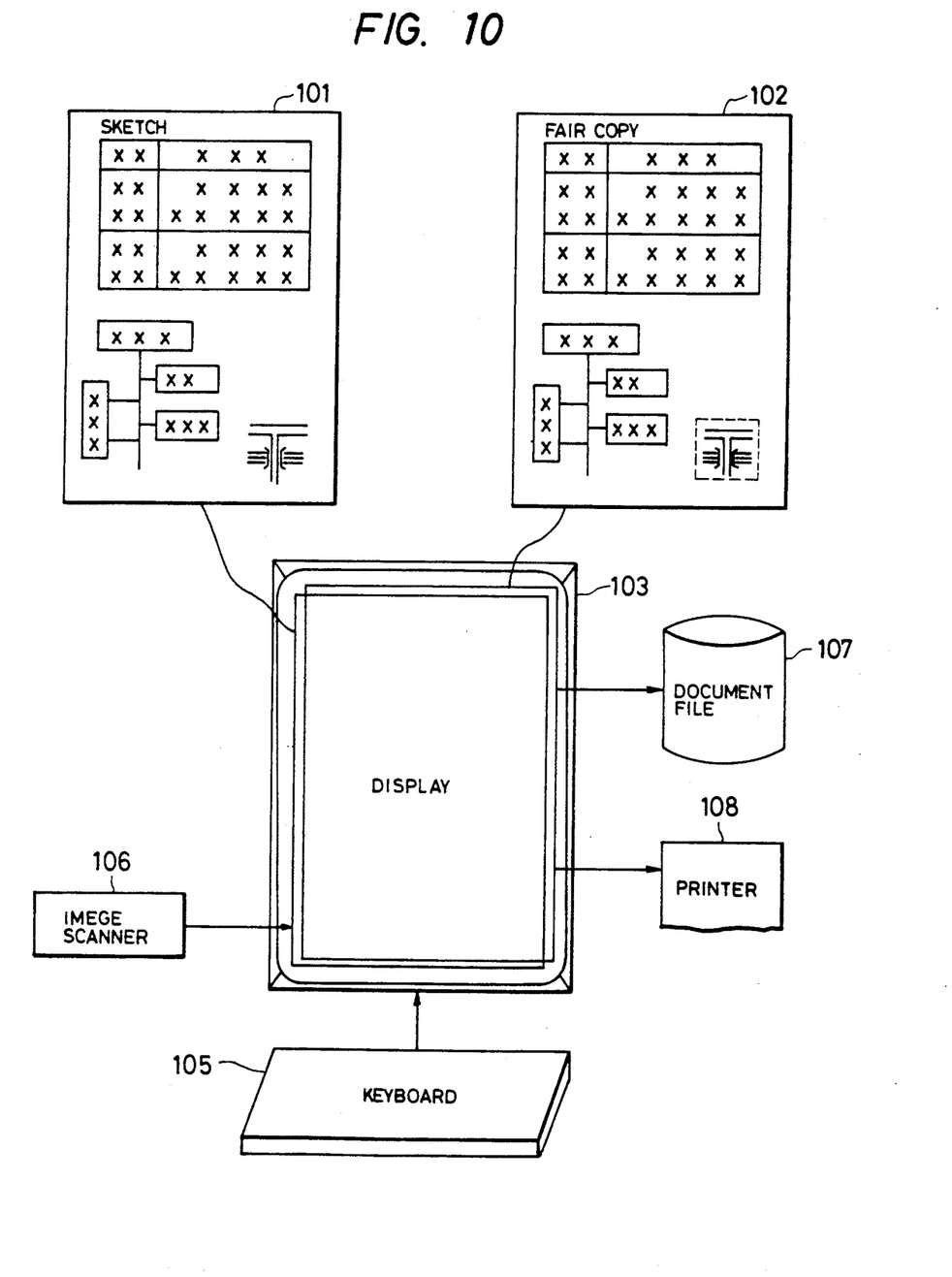
FIG. 10 is a diagram which illustrates the outline of the document compilation system according to the present invention.

FIG. 10 is a diagram which schematically illustrates the structure of a document compilation system with which the present invention is put into practice, and wherein reference numeral 101 denotes a sketch whose contents are input through an image scanner 106 and are displayed on a display unit 103. Reference numeral 102 denotes a figure of fair copy that is displayed being superposed on the sketch, 105 denotes a data input device for preparing the figure of fair copy, 107 denotes a document file for filing the figure of fair copy, and reference numeral 108 denotes a printer for printing the figure of fair copy.

Figure 11:
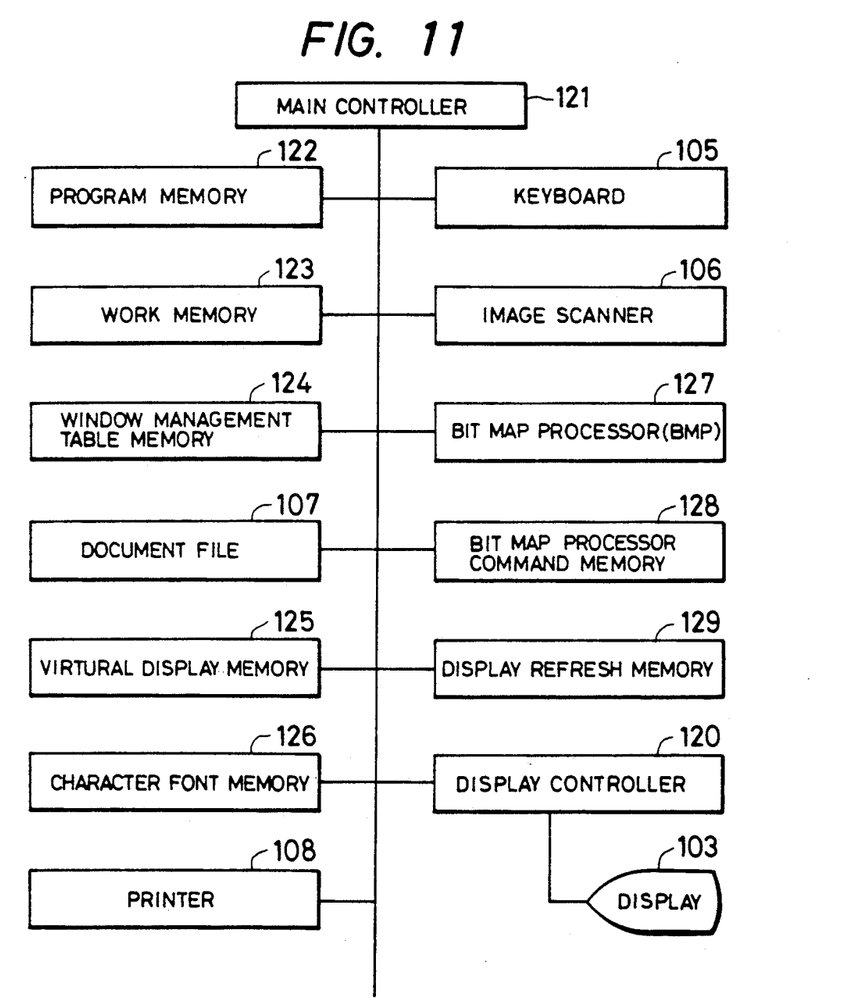
FIG. 11 is a block diagram which illustrates the whole structure of the document compilation system according to the present invention.

FIG. 11 is a block diagram illustrating the whole structure of the document compilation system, wherein reference numeral 121 denotes a main controller for controlling the whole operation of the document compiler, 122 denotes a memory for storing a program that is to be executed by the main controller, 123 denotes a work memory for temporarily storing the data that are produced while the program is being executed, and reference numeral 124 denotes a memory for storing management table data of a display region (window) set on the display 103. In the embodiment of FIG. 10, a window W1 (FIG. 12) for displaying the figure 102 of fair copy are set on the display 103. Reference numeral 125 denotes a memory for storing the data of virtual displays that correspond to the windows. The data of the virtual display corresponding to the window W1 of the sketch 101 is input through the image scanner 106, and the data of virtual display corresponding to the window W2 of the FIG. 102 of fair copy is prepared by the main controller 121 on the basis of the input from the keyboard 105. Reference numeral 126 denotes a memory for storing character fonts that correspond to the character codes, and 127 denotes a bit map processor (BMP) for expanding the display data on the virtual display on the refresh memory (frame memory) in the form of a bit map. Reference numeral 128 denotes a memory for storing a variety of commands necessary for operating the BMP 127, and reference numeral 120 denotes a display controller which successively reads out the contents of the refresh memory 129 and produces them to the display 103.

Figure 12:
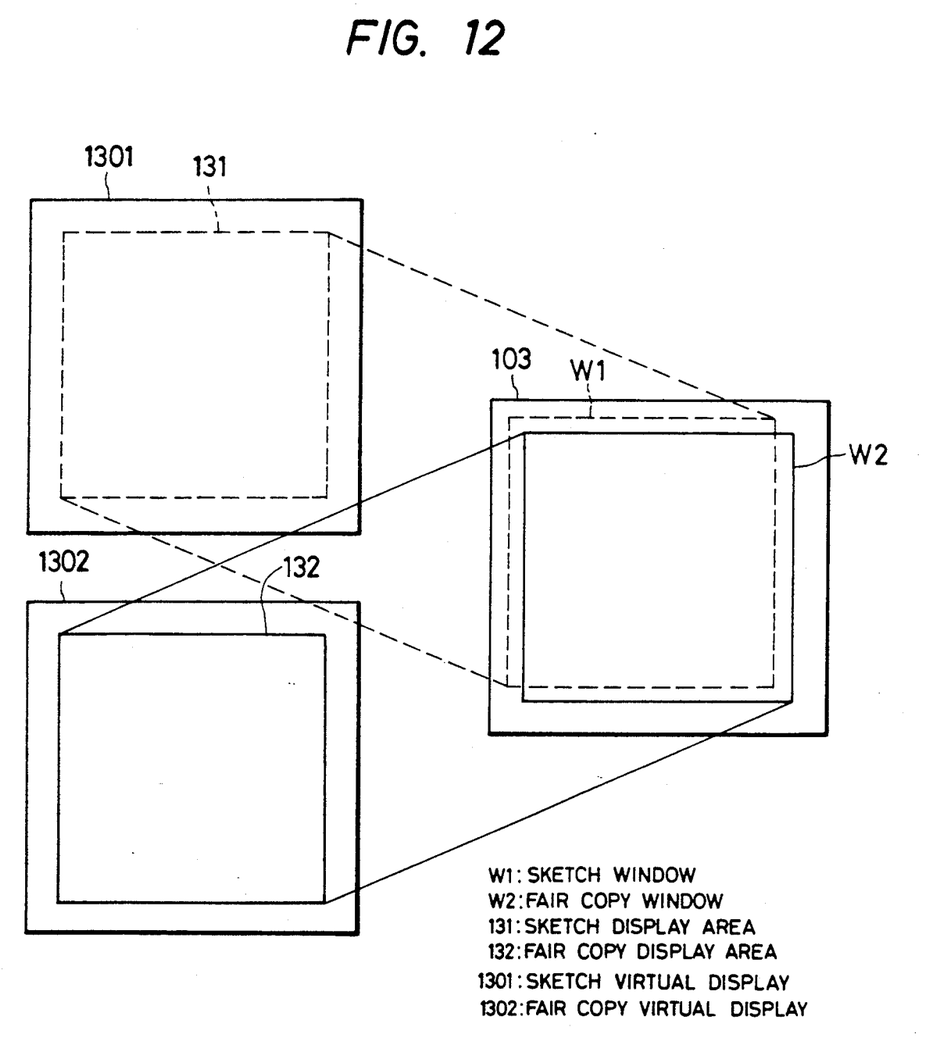
FIG. 12 is a diagram which illustrates the relationship between a window on the display and a display area on the virtual display.

FIG. 12 shows a relationship between virtual displays 1301, 1302 stored in the virtual display memory 125 and the windows W1, W2 set on the display (real display) 103. In this case, the positions and sizes of the windows are represented by X- and Y-coordinates $(X_1, Y_1)$ is an upper left position of rectangles of the windows and by X- and Y-coordinates $(X_1', Y_1')$ at a lower right position thereof. The data positioned on part of the display areas 131, 132 of virtual displays 1301, 1302 are displayed on the windows W1, W2. Like the windows W1 and W2, the positions and sizes of the display areas 131 and 132 are represented by x- and y-coordinates $(x_1, y_1)$ and $(_1', y_1')$ of a left upper position and a right lower position thereof. The relationship between the windows W1, W2 and the display areas 131, 132 is stored in a window management table 1240 (FIG. 13) formed in the memory 124.

Figure 13:
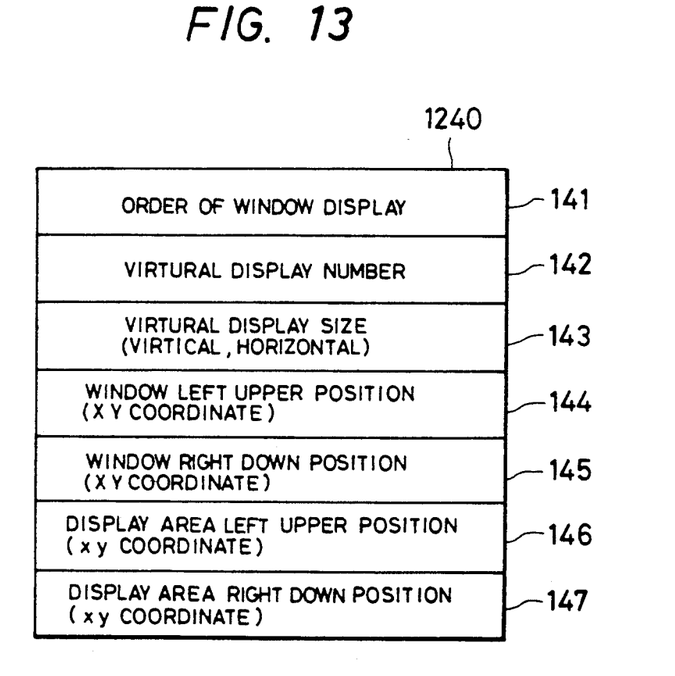
FIG. 13 is a diagram showing a window management table.

The window management table 1240 is prepared to correspond to the sketch window W1 and the fair copy display window W2 that are set on the display 103. As shown in FIG. 13, the table 1240 is comprised of an order of window display 141, a virtual display identification number 142 which corresponds to the windows, vertical and horizontal virtual display sizes 143, XY coordinate 144 at the upper left position of the window, XY coordinate 145 at the lower right position of the window, xy coordinate 146 at the upper left position in the display area on the virtual display, and xy coordinate 147 at the lower right position in the display area on the virtual display.

Figure 14:
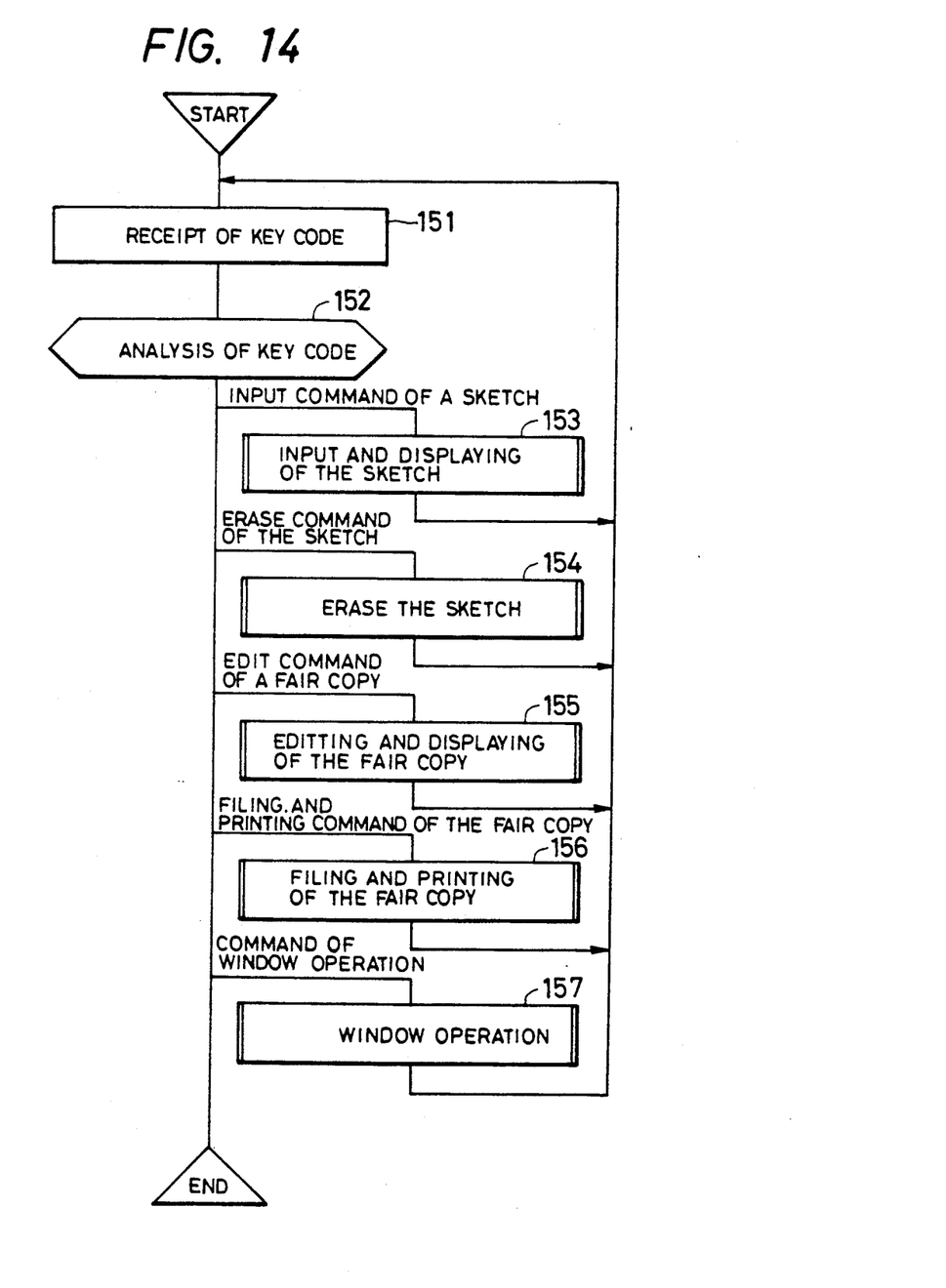
FIG. 14 is a flow chart illustrating an embodiment of a program for realizing the present invention.

FIG. 14 is a flow chart of a program with which the present invention is realized. A step 151 receives a key code that is input from the keyboard 105. A step 152 analyzes the key code that is received and calls a corresponding subroutine. When the key code designates the sketch input, a sketch input display subroutine 153 is called. When the key code designates to erase the sketch, a sketch erase subroutine 154 is called. When the key code designates the preparation of the figure of fair copy, a fair copy figure preparation subroutine 155 is called. When the key code designates the filing or printing of the figure of fair copy, a fair copy figure filing/printing subroutine 156 is called. When the key code designates the window operation, a subroutine 157 is called.

Figure 15:
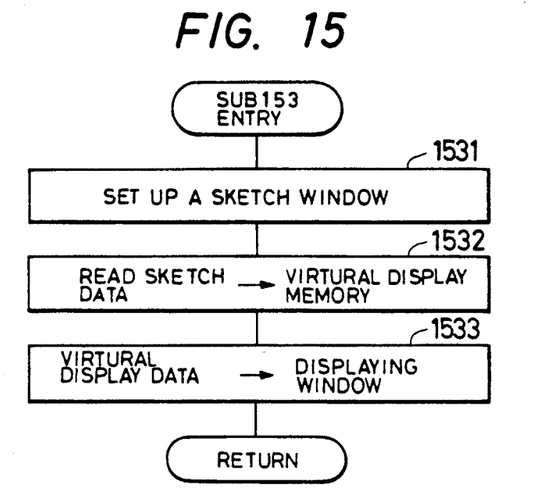
FIG. 15 is a flow chart of a draft input display subroutine.

FIG. 15 is a flow chart of the sketch input display subroutine 153. A step 1531 catalogues the management data of the window displaying the sketch to a window management table 1240. A step 1532 drives the image scanner 106 to read the sketch, and stores the read data onto the virtual display memory 125. A step 1533 transfers the data of the display areas 146 and 147 among the sketch data stored in the virtual display memory 125 to the windows of the portions represented by the positions 144 and 145 in the display refresh memory 129.

Figure 16:
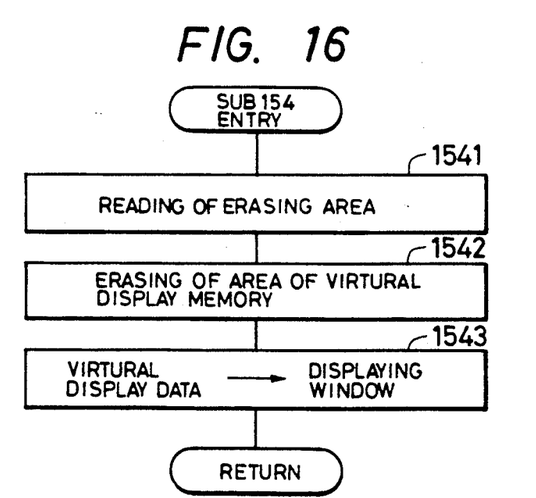
FIG. 16 is a flow chart of a sketch erasing subroutine.

FIG. 16 is a flow chart of the sketch erase subroutine 154. A first step 1541 reads the erasing area that is input by the keyboard 105. A step 1542 clears the designated erasing area on the sketch data in the virtual display memory 125. Like the step 1533 of FIG. 15, a step 1543 transfers the data of display areas 146 and 147 on the virtual display memory 125 to portions of windows 144, 145 in the refresh memory 129.

Figure 17:
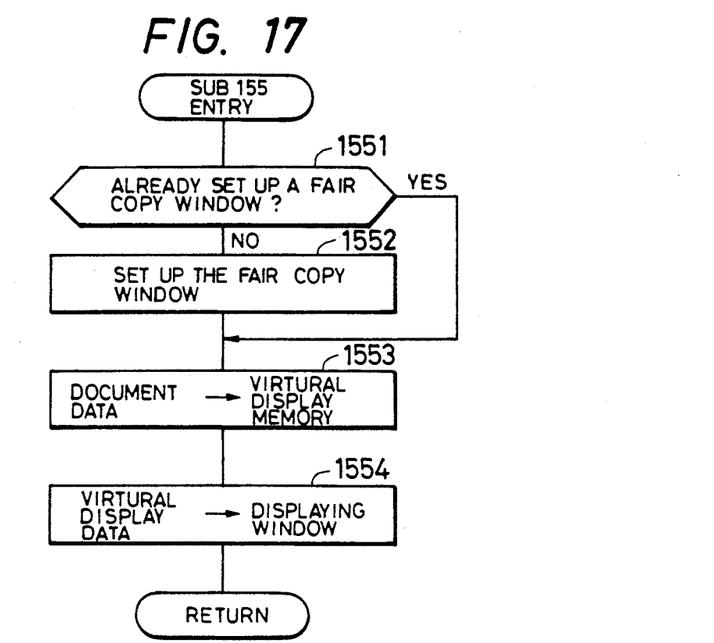
FIG. 17 is a flow chart of a subroutine for displaying a figure of fair copy.

FIG. 17 is a flow chart of the fair copy preparation display subroutine 155. A first step 1551 determines whether the fair copy window has been set. When it has not been set, a step 1552 catalogues the management data of the window displaying the fair copy figure to a window management table 1240 and a step 1553 is effected inclusive of the case where the fair copy window has already been set. The step 1553 stores the document data input through the keyboard 105 in the virtual display memory 125 of fair copy figure. A step 1554 expands the data of the display area on the virtual display memory 125 into the form of a bit map through the bit map processor 127, and transfers them to portions of windows 144 and 145 in the refresh memory 129.

Figure 18:
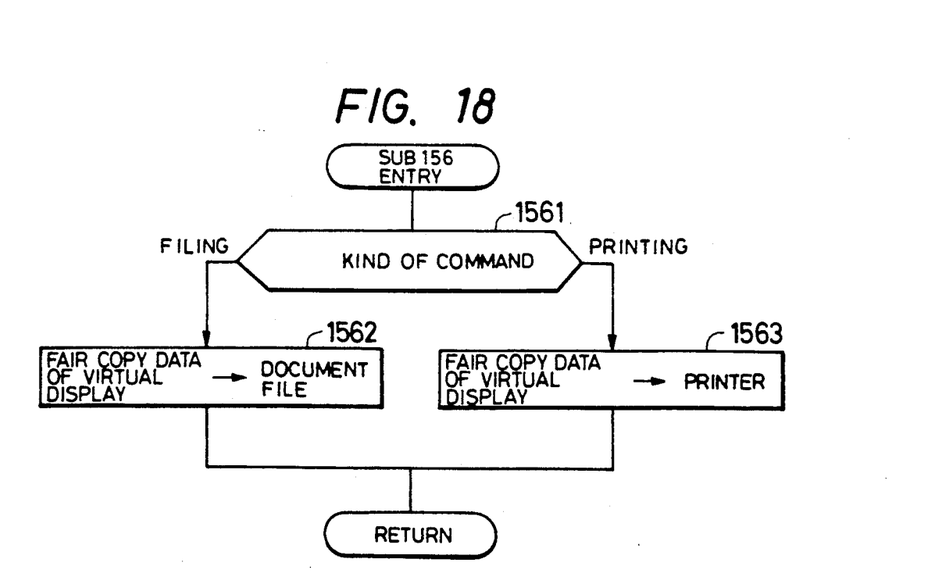
FIG. 18 is a flow chart of a subroutine for filing and printing a figure of fair copy.

FIG. 18 is a flow chart of the fair copy filing/printing subroutine 156. First, a step 1561 discriminates the filing process or the printing process. In the case of filing, a step 1562 is carried out and in the case of printing, a step 1563 is carried out. The step 1562 stores the fair copy data on the virtual display memory 125 in the document file 107.

A step 1563 sends the fair copy data on the virtual display memory 125 to the printer 108.

Figure 19:
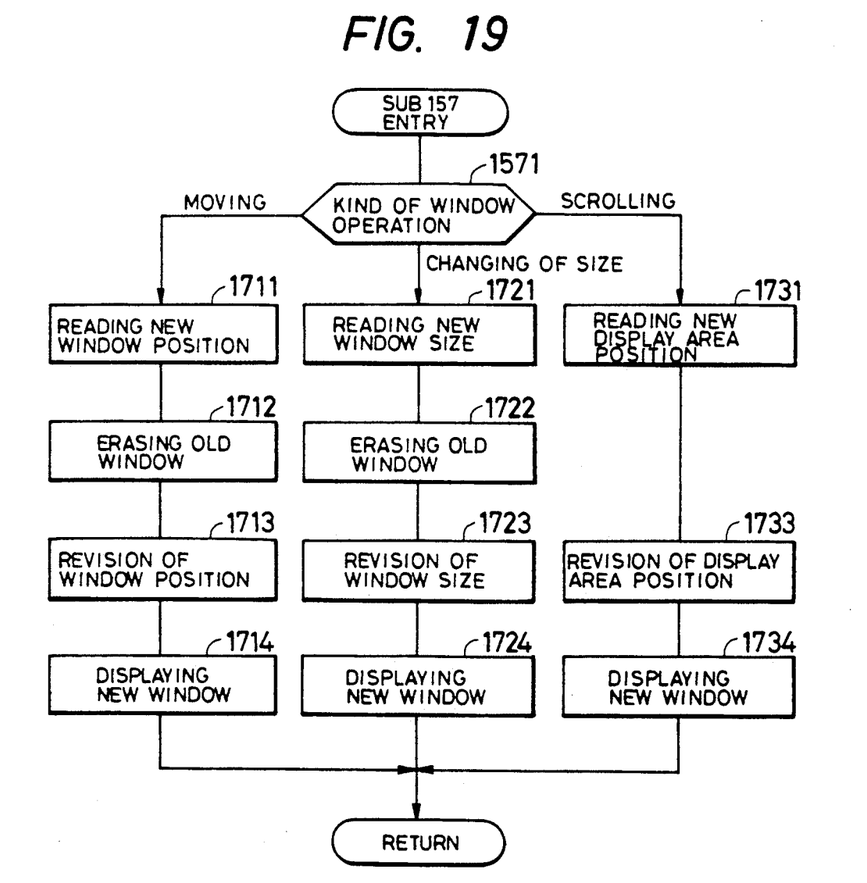
FIG. 19 is a flow chart of a window operation subroutine.

FIG. 19 is a flow chart of the window operation subroutine 157. A first step 1571 discriminates whether the window operation is to move the window, to change the size or to scroll the display area on the virtual display. When the window is to be moved, a step 1711 reads from the keyboard 105 the class of window (sketch window/fair copy window) that is to be moved and the position to where the window is to be moved. A step 1712 erases the old window. A step 1713 renews the XY coordinate 144 at the upper left position of window on the window management table 1240 and the XY coordinate 145 at the lower right position to the values of newly, moved positions. A step 1714 expands the data of renewed display areas 146 and 147 on the virtual display memory 125 into the form of a bit map through the bit map processor 127, and transfers them to the renewed windows 144 and 145 on the refresh memory 129.

To change the size of the window, a step 1721 reads from the keyboard 105 the class of window which size is to be changed and the size of window which diameter is to be changed. A step 1722 erases the window before the size is changed. A step 1723 renews the XY coordinate 145 at the right lower position of the window on the window management table 1240 and the xy coordinate 147 at the right lower position in the display area on the virtual display into newly changed values. A step 1724 expands the data of the renewed display areas 146, 147 on the virtual display memory 125 into the form of a bit map through the bit map processor 127, and transfers them to the portions of the renewed windows 144 and 145 on the refresh memory 129.

To scroll the display area on the virtual display, a step 1731 reads from the keyboard 105 the class of windows to be scrolled and the display position on the corresponding virtual display after it is changed. The step 133 renews the xy coordinate 146 at the upper left position of display area on the virtual display stored in the window management table 1240 and the xy coordinate 147 at the lower right points to values of positions after the display area is moved.

According to the present invention mentioned as described above, the effects are obtained as described below.

(1) The sketch and the figure of fair copy are input, and each displayed in a superposed manner and maintaining different brightness or color to avoid confusion. Therefore, data is not erroneously input, and changes needed to be made are not missed due to the superposing. Further, the sketch input by the image scanner is recognized by the pattern recognition mechanism, and only those portions that are not properly recognized by the recognition mechanism are input manually, making it possible to greatly reduce the time required for the input. As for the portions that were not recognized well, furthermore, the class of component figure is designated to again execute the recognition processing again in order to increase the recognition factor. Even with regard to manually inputting the component figure when, the user designates the class of component figure to be displayed the sample figure indicates the points that should be designated next. Therefore, the fair copy of the component figure is obtained requiring the least amount of work.

(2) Contents of the sketch are easily transferred onto the figure of fair copy. It is further possible to erase undesired portions of the sketch that are seen through being superposed on the displayed portions of input data in the figure of fair copy, enabling the figure of fair copy to be seen clearly.

We claim:

1. A document input method, comprising the steps of:
   (a) inputting from an inputting device a sketch comprised of component figures;
   (b) displaying said sketch on a display;
   (c) selecting one component figure of said sketch;
   (d) selecting one figure of fair copy from a plurality of figures of fair copy stored in a memory, the selection of one figure of fair copy being dependent on a correspondence in configuration between said one figure or fair copy and the selected one component figure;
   (e) displaying the selected one figure of fair copy in a superposed manner, such that differences between the selected fair copy figure and the selected component figure can be detected by an observer, wherein the plurality of figures of fair copy includes a plurality of different shapes all having a predetermined drawing quality;
   (f) inputting from said inputting device a modifying command for modifying at least one of said one component figure and said one figure of fair copy which are displayed on said display in the superposed arrangement;
   (g) modifying at least one of said one component figure and said one figure of fair copy in response to said modifying command, wherein said modifying includes,
      scaling up or down at least one of said one component figure and said one figure of fair copy on said display, responsive to information included in said modifying command,
      selecting for movement at least one of said one component figure and said one figure of fair copy from a present position thereof displayed to a new position on said display, responsive to information included in said modifying command,
      selecting for deletion at least one of said one component figure and said one figure of fair copy displayed on said display;
   (h) repeating steps (c) to (g) until all component figures comprising the sketch have been selected; and
   (i) generating a new document of a predetermined quality based on the inputted sketch, wherein said document includes a plurality of at least one of the component figures and the fair copy figures.

2. The document input method according to claim 1, further including a designating command for designating one of the plurality of figures of fair copy, the designating command including first information of a characteristic point of the selected one component figure, wherein the first information includes data of at least one of a shape, size and position of the selected one component figure indicated by the characteristic point.

3. The document input method according to claim 1, wherein said modifying command includes second information of a new position of at least one of said one component figure and said one figure of fair copy to be moved on said display, said modifying includes selecting for movement at least one of said one component figure and said one figure of fair copy from a present position thereof displayed to said new position on said display, responsive to said second information included in said modifying command.

4. The document input method according to claim 1, wherein said modifying command includes third information of a scaling rate of at least one of said one component figure and said one figure of fair copy to be scaled up or down on said display, said modifying includes selecting for scaling up or down at least one of said one component figure and said one figure of fair copy on said display, responsive to said third information included in said modifying command.

5. The document input method according to claim 1, wherein at least one of said one component figure and said one figure of fair copy include a character sequence which has at least one character.

6. A document processing method comprising:
   (a) converting a sketch into electronic data, the sketch being an approximation of a drawing comprised of a plurality of component figures;

(b) storing the electronic sketch data in an electronic memory;

(c) electronically comparing at least a portion of the electronic sketch data with electronic data representing each of a plurality of preselected fair copy figures stored in a fair copy memory to determine a corresponding fair copy figure, and wherein in response to the electronically comparing initially failing to recognize the electronic sketch data as corresponding to any of the plurality of fair copy figures the step further, including inputting by an operator a designation representing a class of figures to which the failed to be recognized electronic sketch data belongs, wherein the class of figures corresponds to the plurality of fair copy figures stored in the electronic memory, operator designating a point of at least one component of the figures wherein the designated point indicates an attribute of the electronic sketch data, and repeating the electronically comparing step with electronic sketch data and data of the attribute of the electronic sketch data indicated from the designated point, the plurality of fair copy figures being a plurality of different drawing configurations each of a predetermined drawing quality;

(d) electronically withdrawing from the fair copy memory the electronic data representing the corresponding fair copy figure found in the electronically comparing step for generating a display of the corresponding fair copy figure;

(e) displaying the selected one figure of fair copy in a superposed manner, such that differences between the selected fair copy figure and the selected component figure can be detected by an observer through differences in at least one of, color and brightness between the fair copy figure and the selected component figure and wherein the differences in the brightness and color are modified when the two figures are similar;

(f) repeating steps (b) through (g) until all component figures comprising the sketch have been selected; and (g) generating a new document of a predetermined quality based on the sketch, wherein the document includes a plurality of at least one of the component figures and the fair copy figures.

7. A document processing method comprising:

(a) converting a sketch into electronic data, the sketch being an approximation of a drawing comprised of a plurality of component figures;

(b) storing the electronic sketch data in an electronic memory;

(c) electronically comparing at least a portion of the electronic sketch data with electronic data representing each of a plurality of preselected fair copy figures stored in a fair copy memory to determine a corresponding fair copy figure, and wherein in response to the electronically comparing initially failing to recognize the electronic sketch data as corresponding to any of the plurality of fair copy figures the step further, including inputting by an operator a designation representing a class of figures to which the failed to be recognized electronic sketch data belongs, wherein the class of figures corresponds to the plurality of fair copy figures stored in the electronic memory, operator designating a point of at least one component of the figures wherein the designated point indicates an attribute of the electronic sketch data, and repeating the electronically comparing step with electronic sketch data and data of the attribute of the electronic sketch data indicated from the designated point, the plurality of fair copy figures being a plurality of different drawing configurations each of a predetermined drawing quality;

(d) electronically withdrawing from the fair copy memory the electronic data representing the corresponding fair copy figure found in the electronically comparing step for generating a display of the corresponding fair copy figure;

(e) displaying the selected one figure of fair copy in a superposed manner, such that differences between the selected fair copy figure and the selected component figure can be detected by an observer through differences in at least one of, color and brightness between the fair copy figure and the selected component figure and wherein the differences in the brightness and color are modified when the two figures are similar;

(f) inputting from said inputting device a modifying command for modifying at least one of said one component figure and said one figure of fair copy displayed on said display in said superposed arrangement;

(g) modifying at least one of said one component figure and said one figure of fair copy in response to said modifying command, wherein said modifying includes, selecting for scaling up or down at least one of said one component figure and said one figure of fair copy of said display, responsive to information included in said modifying command, selecting for movement at least one of said one component figure and said one figure of fair copy from a present position thereof displayed to a new position on said display, responsive to information included in said modifying command, selecting for deletion at least one of said one component figure and said one figure of fair copy displayed on said display;

(h) repeating steps (b) through (g) until all component figures comprising the sketch have been selected; and, (i) generating a new document of a predetermined quality based on the sketch, wherein the document includes a plurality of at least one of the component figures and the fair copy figures.

* * * * *